Jan. 30, 1962  W. A. ROSS  3,018,848
ADAPTER ADJUSTING MEANS FOR VEHICLE LIFTS
Filed July 25, 1958  3 Sheets-Sheet 1
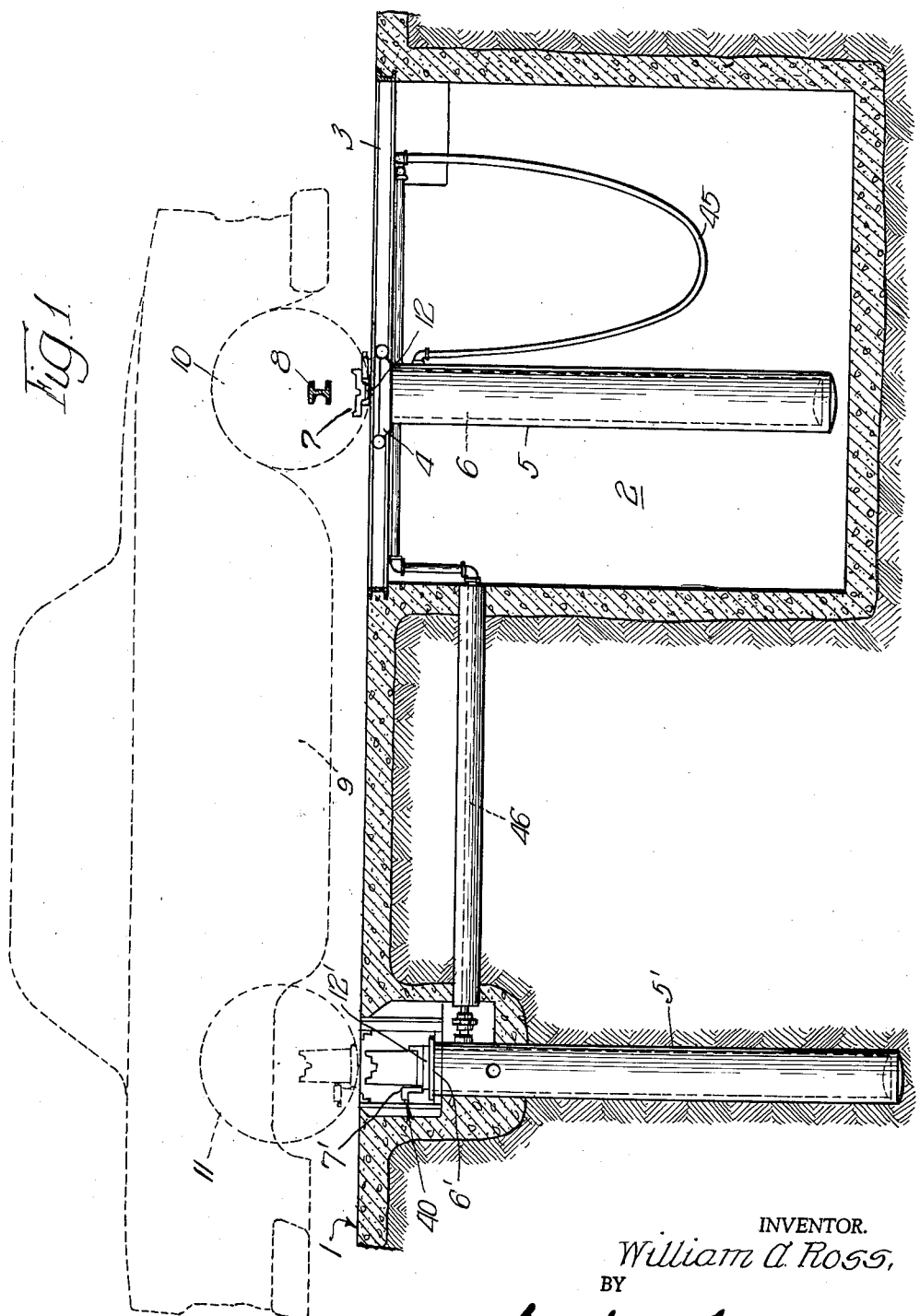
INVENTOR.
William A. Ross,
BY

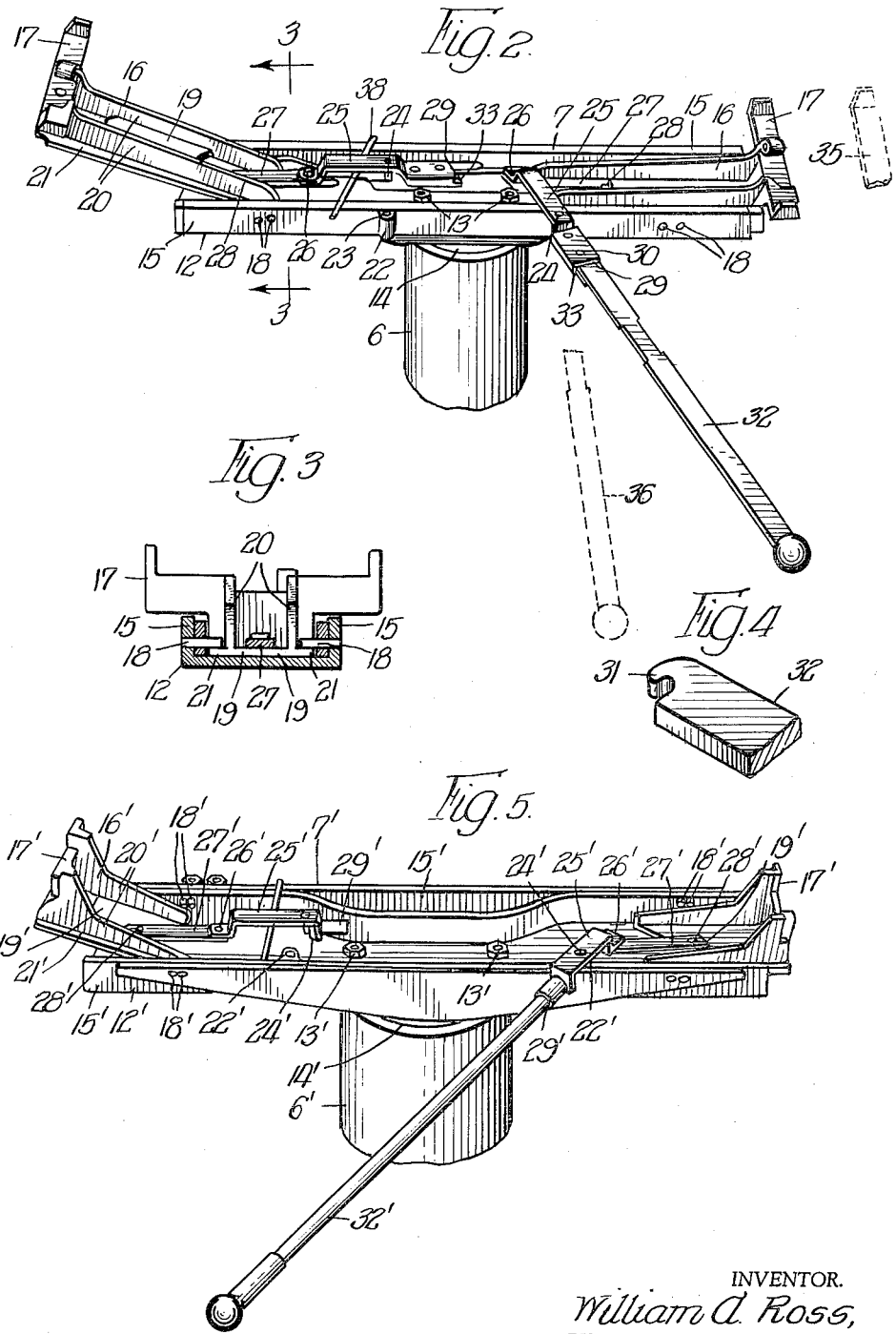

Jan. 30, 1962　　　　　W. A. ROSS　　　　　3,018,848
ADAPTER ADJUSTING MEANS FOR VEHICLE LIFTS
Filed July 25, 1958　　　　　　　　　　　　3 Sheets-Sheet 3
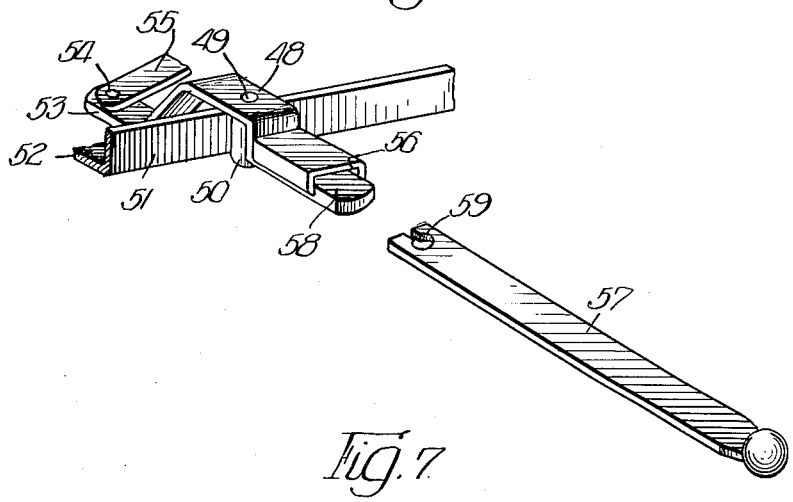
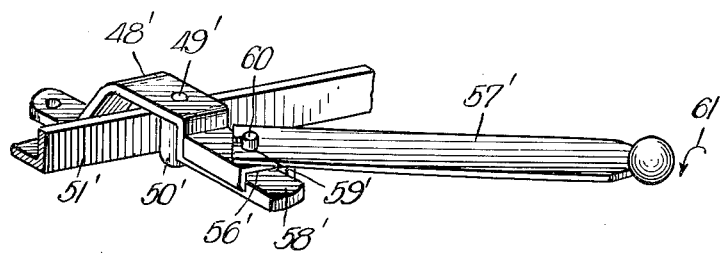
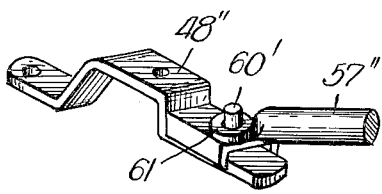
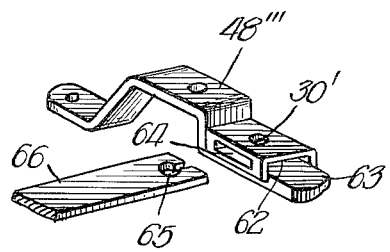
INVENTOR.
William A. Ross,
BY United States Patent Office 3,018,848
Patented Jan. 30, 1962

3,018,848
ADAPTER ADJUSTING MEANS FOR VEHICLE LIFTS
William A. Ross, Springfield, Ill., assignor, by mesne assignments, to Dura Corporation, Oak Park, Mich., a corporation of Michigan
Filed July 25, 1958, Ser. No. 750,981
5 Claims. (Cl. 187—8.75)

This invention relates to adapter adjusting means for lifts for vehicles, such as automobiles, trucks, buses and the like, which are operable to raise the vehicle from the ground or floor to permit easy access to its lower parts for servicing, repairs, adjustments, etc.

More particularly, the invention relates to improvements in adapter adjusting means for vehicle lifts, in general, of the character disclosed and claimed in Ira A. Weaver, Patent No. 1,849,777, patented March 15, 1932, although the present invention is not limited to use with that particular form of lift, but is just as applicable to single, triple, or four posts or more.

In the use of lifts of the character described it is desirable that the lift part which underlies the wheel suspension, axle, or other appropriate part of the vehicle, have lifting engagement with such part in close proximity to the inner sides of the wheels. In the present state of the art this has presented a problem, due to the wide variations in the treads, or transverse distances between opposite wheels of different vehicles, particularly in foreign and other small vehicles, as compared with the larger vehicles with wider treads. Also, adapters have become bulky in weight which increases effort to move them under the very low clearance vehicles.

One of the main objects of the present invention is the provision of novel and improved means for adjusting the vehicle engaging and lifting portion of the lift transversely to adapt the same for use with vehicles having wide variations in the treads, or transverse distances between opposite wheels thereof.

Another object is to provide means which may be operated with comparative ease and dispatch to adjust the vehicle engaging and lifting portion of the lift transversely so that the same will have lifting engagement with the appropriate part of the vehicle, preferably in close proximity to the inner sides of the wheels and with wheels having wide variations in the treads, or transverse distances between the opposite wheels thereof.

Another object is to provide an improved vehicle engaging and lifting portion for a vehicle lift, which comprises a lifting saddle over which a wheel suspension, axle, or other appropriate part of the vehicle is adapted to be positioned; an adapter carried by such saddle and adapted to engage and elevate the adjacent portion of the vehicle; a lever having pivotal support on the saddle and pivotal connection with the adapter; and a member engageable with the lever and operable to impart pivotal movement to the lever to move the adapter accurately and with ease and dispatch to different transverse positions with respect to the saddle to adapt the adapter to coact with the appropriate portion of the vehicle in close proximity to the wheel of the vehicle and with vehicles having wide variations in treads, or transverse distances between the wheels thereof.

Another object is to provide an improved vehicle engaging and lifting portion of the character set forth wherein the pivotal connection between the lever and the adapter comprises an intermediate link pivoted at one end to the lever and at its other end to the adapter for accomplishing the desired transverse movement of the adapter.

Another object is to provide an improved vehicle engaging and lifting portion wherein the outer end of the lever has a socket provided with a pin for receiving and cooperation with a hooked end on the operating member, and wherein the lever has a land or lug projecting from the bottom of the socket for receiving and guiding the end of the lever into the socket.

Another object is to provide an improved vehicle engaging and lifting portion of the character set forth wherein the saddle has upright flanges along opposite sides thereof and guide members projecting inwardly from such flanges, and wherein the adapter has transverse sliding movement with respect to the saddle and is provided with guide flanges disposed generally normal to the upright flanges on the saddle and operable beneath the guide members to guide the adapter in its transverse sliding movement with respect to the saddle.

Another object is to provide an improved vehicle engaging and lifting portion of the character set forth wherein there is a seat member on the outer end of the adapter and disposed transversely with respect to the transverse movement of the adapter and shaped to engage the wheel suspension, axle, or other appropriate part of the vehicle.

Another object is to provide an improved vehicle engaging and lifting portion of the character set forth which may be positioned below, or substantially flush with the ground or floor level when the lifting means is in lowered position, particularly in connection with the vehicle engaging and lifting portion for engaging and lifting the axle housing or other appropriate part at the rear of the vehicle.

Further objects and advantages of the invention will be apparent from the following detailed description taken in connection with the accompanying drawings, it being understood that the invention is limited only within the scope of the appended claims and not to the particular embodiments selected for illustration.

In the drawings:

FIGURE 1 is a central, vertical, longitudinal section through an illustrative form of vehicle lift as it is installed in the ground, showing, for the front and rear parts of the vehicle, vehicle engaging and lifting portions embodying the present invention;

FIGURE 2 is a perspective view viewed from the front of the transversely adjustable lift part for engaging and lifting the wheel suspension, axle or other appropriate part at the front of the vehicle;

FIGURE 3 is a transverse section taken on the line 3—3 of FIGURE 2;

FIGURE 4 is a fragmentary perspective view showing the hooked end of the operating member removed from the socket in the outer end of the lever;

FIGURE 5 is a perspective view viewed from the rear of the transversely adjustable lift part for engaging and lifting the axle housing, or other appropriate part at the rear of the vehicle;

FIGURE 6 is a fragmentary perspective view of another form of pivoted lever and showing the operating bar for detachable engagement therewith;

FIGURE 7 is a fragmentary perspective view of a further form of pivoted lever showing the operating bar in lateral engagement therewith;

FIGURE 8 is a fragmentary perspective view showing another form of operating member in engagement with the form of lever shown in FIGURE 7; and FIGURE 9 is a fragmentary perspective view showing another form of pivoted lever and another form of lateral engagement of the operating member therewith.

Referring now to the drawings, the vehicle lift, in general, corresponds with the form of lift shown and more fully described in the Ira A. Weaver patent previously identified herein. When not in operation the lift is located below the ground level or floor level 1.

A suitable pit 2 of appropriate length, depth and width has, for example, a pair of horizontal channel bars 3 along which a small truck or carriage 4 is movable longitudinally to adapt the lift to vehicles of different wheelbase lengths as covered by the aforementioned patent. The carriage 4 carries a vertical cylinder 5 closed at its lower end.

Inside, and adapted to slide vertically in the cylinder 5, is a hollow plunger 6 closed at its bottom.

At its top, the vertically slidable plunger 6 is provided with the transversely adjustable lift means 7 for engaging and lifting the wheel suspension, axle, or other appropriate part, designated, in general at 8, for the front of the vehicle, which is shown, in general, in dotted lines at 9 and has opposite front wheels 10. The rear wheels of the vehicle are shown at 11.

As shown more fully in FIGURE 2, the transversely adjustable lift part 7 comprises a transversely disposed metallic lifting saddle 12 secured intermediate its ends, for example, by bolts and nuts 13, to the top of the plunger 6 for vertical movement therewith. The bolts may cooperate, for example, with an upper end wall 14 fixed within the plunger 6 below the upper end thereof.

The saddle 12 has upright flanges 15 along the opposite sides thereof and is provided with a pair of metal adapters 16, one slidable transversely in each of the opposite ends of the saddle 12. At its outer end each adapter 16 has an integral seat member 17 disposed transversely with respect to the transverse movement of the adapter and shaped to engage the wheel suspension, axle, or other appropriate part at the front of the vehicle.

Guide means, shown in the form of guide pins 18, or of other suitable form, projects inwardly from the flanges 15. Each adapter 16 has a base 19 and upright flanges 20. Guide flanges 21 coplanar with the base 19 and disposed generally normal to the flanges 15 project outwardly from the flanges 20 and when positioned beneath the guide means 18, as shown in connection with the right hand adapter 16 in FIGURE 2, guide the adapters in their transverse sliding movement with respect to the saddle 12.

The outer front side of the front flange 15 has a pair of integral bosses or protuberant parts 22 provided with openings 23 to receive pivot pins 24 carried by levers 25. Each lever 25 has a downwardly offset inner end pivoted by a pin 26 to a link 27. The opposite end of each link 27 is pivoted by a pivot pin 28 to the base 19 of the adjacent adapter 16.

The outer end of each lever 25 has a socket at 29 provided with a pin 30 for receiving and cooperation with a hooked end 31 on the operating member or handle 32; also with a land or lug 33 integral with the outer end of the lever 25 and projecting from the bottom of the socket 29 for receiving the hooked end 31 of the member 32 and guiding the same into the socket 29 and into cooperation with the pin 30.

In FIGURE 2 the adapter 16 at the right hand end of the saddle 12 is shown in operating position. Upon inserting the hooked end 31 of the member 32 into the socket 29 the adapter 16 is moved transversely outwardly into any desired position beneath the wheel suspension, axle, or other appropriate part of the vehicle at the front thereof, for example, to the position shown in dotted lines at 35 by swinging the member 32 in a clockwise direction about the pivot 24, for example, to the position shown in dotted lines at 36. The adapter 16 is moved transversely inwardly to any desired position by swinging the member 32 in the opposite direction, i.e. in a counter-clockwise direction about the pivot 24.

The adapter 16 at the left hand end of the saddle 12 is shown in FIGURE 2 as tilted from its normal operating position in order to show more fully the structure of the adapter and method of assembly. The lever 25 for this adapter 16 at the left hand end is shown with its pivot 24 removed from the opening 23 and with the lever 25 positioned within the saddle 12 and supported upon a cross piece 38 so that the lever 25 will be plainly in view.

For use, the left hand adapter 16 is placed in operating position similar to that shown for the right hand adapter and with the pivot pin 24 in the opening 23. The left hand adapter may then be adjusted transversely and accurately to the desired position with ease and dispatch by placing the hooked end of the member 32 on the land or lug 33 and slipping it into the socket 29, whereupon the adapter is moved inwardly or outwardly in a transverse direction by swinging the member 32 about the pivot 24.

The transversely adjustable lift means for engaging and ilfting the axle housing or other appropriate part at the rear of the vehicle, which has rear wheels shown in dotted lines at 11 in FIGURE 1 may be, as shown in FIGURE 5, similar to the lift part for the front of the vehicle and the parts thereof as shown in FIGURE 5 are designated by primed reference numerals corresponding with the reference numerals appearing in FIGURE 2.

The bosses or protuberant parts 22' of the rear saddle 12' are preferably on the inner side of the rear flange 15' instead of on the outer side of the front flange 15 as they are preferably disposed on the front saddle 12. This permits the rear saddle and associated lift parts to be positioned in a recess 40 in the floor and below or substantially flush with the ground or floor level when the lifting means is in its lowered position.

The operating member 32' for moving the rear adapters 16' transversely similar to the operation described in connection with the front adapters 16 is preferably of round or circular section for heavy duty purposes. The end of the member 32' is selectively insertable into sockets 29' at the outer ends of the levers 25' for swinging these levers to move the adapters 16' transversely to the desired positions.

The adapter 16' at the right hand end of the saddle 12' is shown in operating position, whereas, the adapter 16' at the left hand end of the saddle is shown tilted from its normal operating position, more fully to show the structure thereof. The integral seat members 17' at the outer ends of the rear adapters 16 are of somewhat different shape than the seats 17 on the front adapters 16.

It will be noted from FIGURES 2 and 5 that the handle 32 is operated from the front of the vehicle and that the member 32' is operated from the rear of the vehicle. Thus adequate clearance for operation is assured at each end.

The vehicle engaging and lifting structure at the front is not, of course, limited to use with a similar structure at the rear, as shown and described, but, may be used with a rear lifting saddle of the character shown in the herein identified patent for engaging and elevating the back or rear-end portion of the vehicle by engagement, for example, with its rear-axle or differential housing.

The bar type operating member 32 as shown in FIGURE 2 may be adapted to fit into and operate a ratchet mechanism for adjusting the carriage 4 and the front lift mechanism associated therewith longitudinally toward and from the rear lift means to adapt the lift to vehicles of different wheelbase lengths.

The apparatus is operated as follows:

The automobile, truck, bus or other vehicle, is driven over the appliance until its rear axle housing, or other appropriate rear part, is over the rear saddle 12' and adapters 16'.

Thereupon, by means of the member 32, or by manipulation of a valve as shown in the herein mentioned Ira A. Weaver patent, the carriage 4 is adjusted longitudinally to bring the forward plunger 6 and its saddle 12 and adapters 16 in correct position beneath the front wheel suspension, axle, or other appropriate part of the vehicle.

The adapters 16 and 16' are then moved transversely to proper transverse positions depending upon the tread or transverse distances between the opposite wheels of the vehicle and preferably to positions in close proximity to the inner sides of the wheels of the vehicle.

The valves, for example, as shown in the herein identified patent may be opened more or less to admit oil or other fluid under pressure into the cylinders 5 and 5' through connections including, for example, a flexible base 45 and a pipe 46 to cause the simultaneous and equal ascent of the two plungers 6 and 6' and their lifting saddles and transversely adjusted adapters to engage and raise the vehicle the required amount and to maintain it horizontal throughout.

The valves, for example, may then be closed to terminate the lifting operation and to prevent the heavier end of the vehicle from settling and bringing about an inclination of the elevated vehicle.

The work on the vehicle having been completed, valves, or the like, may be opened to provide the desired rate of descent of the vehicle to its lowered position on the ground or floor as disclosed, for example, in the herein identified patent.

In FIGURE 6 the lever 48 corresponds with the levers 25 of FIGURE 2 and the levers 25' of FIGURE 5 and has a pivot pin 49 which similarly pivots the lever 48 to the boss or protuberant part 50 on the flange 51 of the saddle 52. The downwardly offset inner end 53 of the lever 48 is pivoted by a pin 54 to a link 55 which is pivoted at its opposite end to the adjacent adapter in the manner shown, for example, in FIGURES 2 and 5.

The outer end of the lever 48 has a socket 56 for receiving the end of the operating bar 57. A land or lug 58 integral with the outer end of the lever 48 and projecting from the bottom of the socket 56 is adapted for receiving the end of the operating bar 57 and guiding the same into the socket 56. This structure is similar to the corresponding structure shown in FIGURE 2, except that the pin 30 of FIGURE 2 is omitted. Accordingly the opening or hooked end at the end of the bar 57 may be omitted, although such an opening is shown at 59 in FIGURE 6 to enable, for example, use of the operating bar when detached from the lever 48 for longitudinally adjusting the carriage 4.

The structure shown in FIGURE 7 is similar to the structure shown in FIGURE 6 and corresponding parts thereof are designated by primed reference numerals corresponding with the reference numerals appearing in FIGURE 6.

In FIGURE 7, however, the socketed portion 56' of the lever 48' carries an upright external pin 60 which is adapted to enter the enlarged opening 59' in the operating lever 57'. Then by turning the bar 57', as shown by the arrow 61, the bar will clamp the pin 60 so that the lever 48' may be operated. This enables using the operating bar from either side of the vehicle, as well as from the front or rear by engaging the end of the bar in the socket 56' as previously described.

The structure shown in FIGURE 8 is similar to that shown in FIGURE 7 except that the operating bar 57" may be of round or circular section and carries a ring 61 which may be applied over the pin 60' on the lever 48" for operating the same.

The structure shown in FIGURE 9 is similar to the structure shown in FIGURE 2 except that the socketed outer end of the lever 48''' not only has the socket 62 with the land or lug 63, but, also, has a lateral passage 64 opening laterally therethrough to permit the hooked end 65 of the operating bar 66 to be inserted therein laterally from either side and, for example, into engagement, if desired, with a pin 30' which corresponds with the pin 30 of FIGURE 2. The operating bar 66 is thus adapted for use from either side and from the front or rear.

The embodiments of the invention shown in the drawings are for illustrative purposes only and it is to be expressly understood that said drawings and the accompanying specification are not to be construed as a definition of the limits or scope of the invention, reference being had to the appended claims for that purpose.

I claim:

1. In a vehicle support structure for use with a vehicle lift having a vertically movable plunger; a transverse lifting saddle having a base and fixedly attached to the upper end of said plunger for vertical movement therewith and against movement relative to said plunger in a longitudinal direction with respect to the vehicle, said saddle having longitudinally spaced and transversely extending upright flanges, a pair of adapter members having planar sliding movements transversely on said saddle adjacent the opposite ends thereof and between the upright flanges of said saddle, guide means carried by said upright flanges and projecting inwardly therefrom, said adapter members having transversely extending guide flanges slidable transversely between the base of said saddle and said guide means, a transversely disposed integral seat member at the outer end of each adapter member, said seat members being positioned solely by transverse planar sliding movements of said adapter members for engagement with opposite ends of a wheel axle in close proximity to the opposite wheels associated with the axle, a pair of levers pivoted for horizontal swinging movements on vertically disposed and transversely spaced pivots carried by said saddle, a first pivotal connection between one end of one lever and one adapter member, a second pivotal connection between one end of the other lever and the other adapter member, and a handle selectively cooperable with the other ends of said levers and adapted for horizontal swinging movement for swinging said levers horizontally with accompanying transverse movements of said adapter members.

2. A vehicle support structure according to claim 1, wherein the pivotal connections between the levers and the adapter members comprise intermediate horizontally acting links each pivoted to one end of said levers and at its other end to one of said adapter members.

3. A vehicle support structure according to claim 1, wherein each lever has at its outer end a socket in which the end of the handle is removably engageable, and horizontally projecting lands integral with said levers and projecting outwardly beyond the bottoms of such sockets for guiding the end of the handle into said sockets.

4. A vehicle support structure according to claim 1, wherein each lever extends across the upper edge of one of the upright flanges of the saddle and outwardly of said flange is offset downwardly for engagement with said flange to limit movement of said levers in opposite directions and thereby the transverse movements of said adapter members in opposite directions with respect to the lifting saddle.

5. A vehicle support structure according to claim 1, wherein each lever has at its outer end a pin and the handle has an opening in which said pins are engageable to permit use of the handle from either side of the vehicle.

References Cited in the file of this patent
UNITED STATES PATENTS

| | | |
|---|---|---|
| 1,335,479 | Burkholder | Mar. 30, 1920 |
| 1,637,125 | Nelson | July 26, 1927 |
| 1,804,187 | Terry | May 5, 1931 |
| 1,849,777 | Weaver | Mar. 15, 1932 |
| 2,365,771 | Olson | Dec. 26, 1944 |
| 2,543,260 | Teegarden | Feb. 27, 1951 |
| 2,568,271 | Campagna | Sept. 18, 1951 |
| 2,592,845 | Aron | Apr. 15, 1952 |
| 2,659,455 | Green | Nov. 17, 1953 |
| 2,708,988 | Hott | May 24, 1955 |

UNITED STATES PATENT OFFICE
CERTIFICATE OF CORRECTION

Patent No. 3,018,848                     January 30, 1962

William A. Ross

It is hereby certified that error appears in the above numbered patent requiring correction and that the said Letters Patent should read as corrected below.

Column 6, line 42, for "to one end of said" read -- at one end to one of said --.

Signed and sealed this 10th day of July 1962.

(SEAL)
Attest:

ERNEST W. SWIDER
Attesting Officer

DAVID L. LADD
Commissioner of Patents